(12) United States Patent
Yamanaka (10) Patent No.: US 8,605,204 B2
(45) Date of Patent: Dec. 10, 2013

(54) IMAGE-PICKUP APPARATUS AND METHOD FOR ADJUSTING TRACKING CURVES

(75) Inventor: Tomoaki Yamanaka, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 204 days.

(21) Appl. No.: 13/295,629

(22) Filed: Nov. 14, 2011

(65) Prior Publication Data

US 2012/0120303 A1 May 17, 2012

(30) Foreign Application Priority Data

Nov. 15, 2010 (JP) ................................. 2010-254364

(51) Int. Cl.
 *H04N 5/232* (2006.01)
 *G03B 17/00* (2006.01)

(52) U.S. Cl.
 USPC ........... 348/347; 348/345; 348/348; 348/356; 396/79; 396/80; 396/81; 396/82

(58) Field of Classification Search
 None
 See application file for complete search history.

(56) References Cited

U.S. PATENT DOCUMENTS

| 6,624,851 | B1 * | 9/2003 | Okajima et al. | ............... | 348/347 |
| 2007/0206936 | A1 * | 9/2007 | Lin et al. | ........................... | 396/81 |
| 2008/0025711 | A1 * | 1/2008 | Chi | ................................. | 396/80 |
| 2008/0109182 | A1 * | 5/2008 | Min et al. | ....................... | 702/104 |
| 2009/0010631 | A1 * | 1/2009 | Okawara | ........................ | 396/104 |
| 2010/0178045 | A1 * | 7/2010 | Hongu | ............................. | 396/80 |
| 2010/0290772 | A1 * | 11/2010 | Ito | .................................... | 396/79 |
| 2012/0008037 | A1 * | 1/2012 | Yamanaka | ..................... | 348/345 |

FOREIGN PATENT DOCUMENTS

| JP | 08-220414 A | 8/1996 |
| JP | 11-183775 A | 7/1999 |

* cited by examiner

*Primary Examiner* — Lin Ye
*Assistant Examiner* — John H Morehead, III
(74) *Attorney, Agent, or Firm* — Rossi, Kimms & McDowell LLP (57) ABSTRACT

The method includes a first adjusting step of adjusting a first tracking curve which has been set so as to keep an in-focus state between a position of a magnification-varying lens and a position of an image sensor, and a second adjusting step of adjusting a second tracking curve which has been set so as to keep the in-focus state between the position of the magnification-varying lens and a position of the focus lens for an object distance. The magnification-varying lens is moved in an optical axis direction during a variation of magnification. The image sensor generates an image signal by photoelectrically converting an optical image formed by an image-pickup optical system. The image-pickup optical system including the magnification-varying lens and a focus lens moved in the optical axis direction during focusing.

10 Claims, 9 Drawing Sheets

IMAGE-PICKUP APPARATUS AND METHOD FOR ADJUSTING TRACKING CURVES

BACKGROUND OF THE INVENTION

1. Field of the Invention

The present invention relates to an adjustment of a tracking curve used in a tracking control which keeps an in-focus state for an object distance during a variation of magnification.

2. Description of the Related Art

In a tracking control, a focus lens is moved in accordance with a tracking curve that is configured to keep an in-focus state between a position (or a focal length) of a variator lens in a zoom lens (magnification-varying lens) and a position of a focus lens for an object distance. This tracking curve is derived from a designed value of an optical element, but the tracking curve obtained from the designed value may shift from an actual tracking curve due to an attachment error or a manufacturing error of the optical element. In this case, it is required to adjust the tracking curve for each image-pickup apparatus (for example, Japanese Patent Laid-Open Nos. ("JP") 08-220414, and 11-183775).

This inventor attempts to develop a tracking control method by moving both a focus lens and an image sensor in order to achieve a wider angle, a higher magnification, and a smaller size. No prior art propose a method for adjusting the tracking curves between them. For example, each of JP08-220414 and JP11-183775 moves the focus lens in the tracking control, but does not move the image sensor.

SUMMARY OF THE INVENTION

The present invention provides an image-pickup apparatus and a method for adjusting a tracking curve of each of a focus lens and an image sensor in a tracking control that moves both the focus lens and the image sensor during variation of magnification.

A method as one aspect of the present invention including a first adjusting step of adjusting a first tracking curve which has been set so as to keep an in-focus state between a position of a magnification-varying lens and a position of an image sensor, the magnification-varying lens being moved in an optical axis direction during a variation of magnification, the image sensor generating an image signal by photoelectrically converting an optical image formed by an image-pickup optical system, and the image-pickup optical system including the magnification-varying lens and a focus lens moved in the optical axis direction during focusing; and a second adjusting step of adjusting a second tracking curve which has been set so as to keep the in-focus state between the position of the magnification-varying lens and a position of the focus lens for an object distance. In the first adjusting step, the focus lens is fixed at each of two points on a set second tracking curve, one of the magnification-varying lens and the image sensor is fixed at a position corresponding to the focus lens, the other of the magnification-varying lens and the image sensor is moved to a position that provides a peak of an evaluation value representing a contrast of the image signal, and a difference between a position of the image sensor corresponding to the position of the focus lens on a set first tracking curve and a position of the image sensor which provides the peak is obtained. In the second adjusting step, the magnification-varying lens and the image sensor are fixed at each of two points on the first tracking curve adjusted by the first adjusting step, the focus lens is moved to a position that provides a peak of the evaluation value, and a difference between a position of the focus lens corresponding to a position of the magnification-varying lens on the set second tracking curve and the position of the focus lens which provides the peak is obtained.

An image-pickup apparatus as another aspect of the present invention includes a magnification-varying lens that is moved in an optical axis direction during a variation of magnification, a focus lens that is moved in the optical axis direction when correcting a focus shift caused due to the variation of magnification or when focusing, an image sensor that photoelectrical converts an optical image formed by an image-pickup optical system including the magnification-varying lens and the focus lens to generates an image signal, and is moved in the optical axis direction when correcting a focus shift caused due to the variation of magnification, an evaluation value generator that generates an evaluation value representing a contrast of the image signal formed by the image sensor, a first adjuster that adjusts a first tracking curve which has been set so as to keep an in-focus state between a position of the magnification-varying lens and a position of the image sensor, a second adjuster that adjusts a second tracking curve which has been set so as to keep the in-focus state between the position of the magnification-varying lens and a position of the image sensor for an object distance; and a controller that controls a drive of the focus lens and the image sensor during variation of magnification based on a first tracking curve adjusted by the first adjuster and a second tracking curve adjusted by the second adjuster. The first adjuster fixes the focus lens at each of two points on a set second tracking curve, and fixes one of the magnification-varying lens and the image sensor at a position corresponding to the focus lens, moves the other of the magnification-varying lens and the image sensor to a position that provides a peak of an evaluation value representing a contrast of the image signal, and obtains a difference between a position of the image sensor corresponding to the position of the focus lens on a set first tracking curve and a position of the image sensor which provides the peak. The second adjuster fixes the magnification-varying lens and the image sensor at each of two points on the first tracking curve adjusted by the first adjuster, moves the focus lens to a position which provides a peak of the evaluation value, and obtains a difference between a position of the focus lens corresponding to a position of the magnification-varying lens on a set second tracking curve and a position of the focus lens which provides the peak.

Further features and aspects of the present invention will become apparent from the following description of exemplary embodiments with reference to the attached drawings.

DESCRIPTION OF THE PREFERRED EMBODIMENTS

Figure 1:
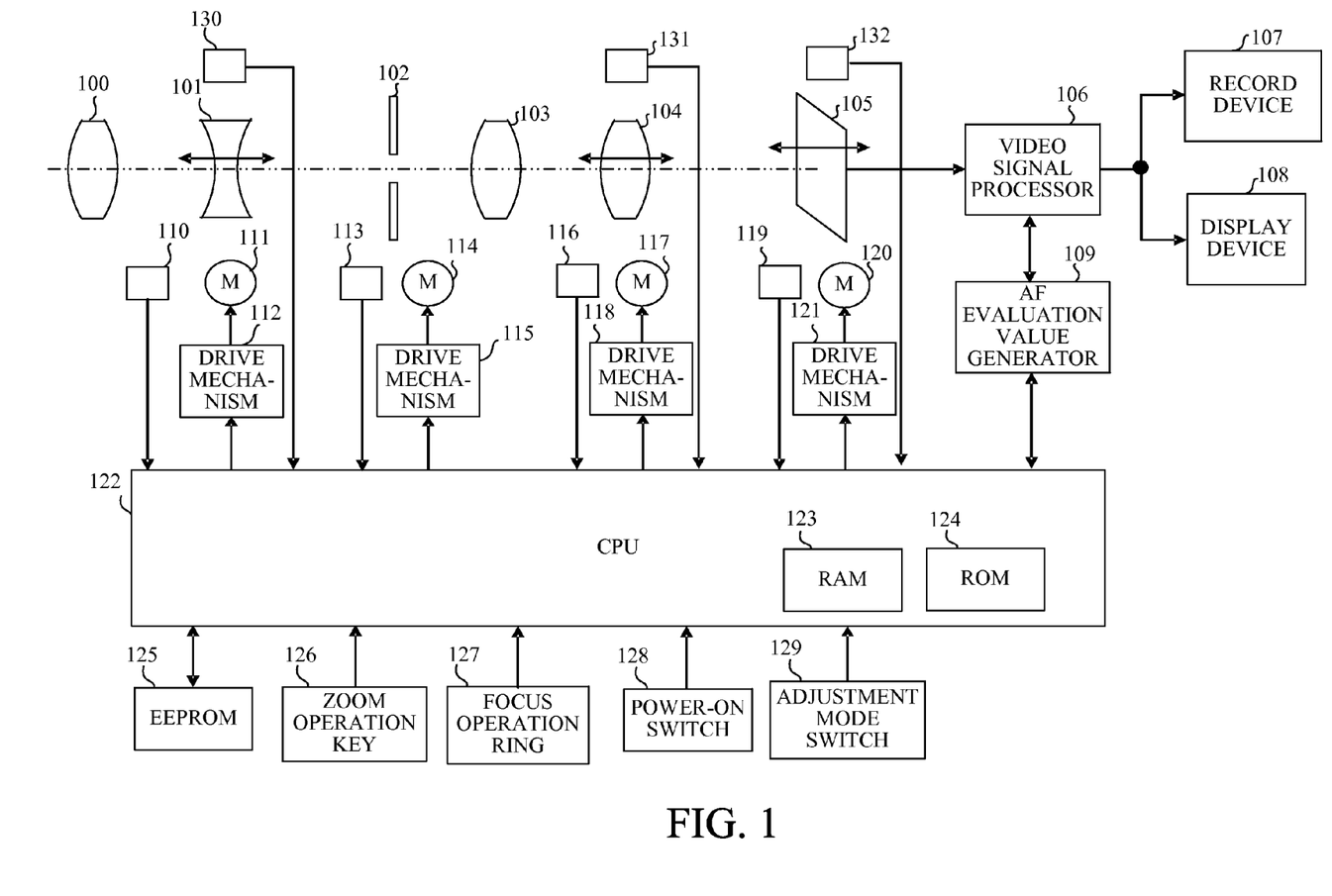
FIG. 1 is a block diagram of an image-pickup apparatus in this embodiment.

FIG. 1 is a block diagram illustrating an image-pickup apparatus, such as a video camera or a digital still camera. Reference numeral 100 denotes a fixed front lens unit, reference numeral 101 denotes a zoom lens unit that is moved in an optical axis direction during variation of magnification (magnification varying lens unit, hereinafter referred to as "zoom lens"), and reference numeral 102 denotes a stop unit that adjusts an amount of light.

Reference numeral 103 denotes a fixed afocal lens unit. Reference numeral 104 denotes a focus lens unit that is moved in the optical axis direction in focusing (hereinafter merely referred to as "focus lens"). In addition, the focus lens 104 is also moved in the optical axis so as to correct a focus shift caused by the variation of magnification.

The front lens unit 100 to the focus lens 104 configure an image-pickup optical system. The image-pickup optical system forms an object image (optical image). Moreover, this image-pickup optical system performs an inner focus (rear focus) where the front lens unit 100 is fixed.

Reference numeral 105 denotes an image sensor (photoelectric conversion element), such as a CCD sensor and a CMOS sensor, that generates an image signal by photoelectrically converting an optical image formed by the image-pickup optical system. The image sensor 105 is moved in the optical axis direction so as to correct a focus shift caused by the variation of magnification.

As above, this embodiment makes the image sensor 105 movable in the optical axis direction, and keeps an in-focus state by moving the focus lens 104 and the image sensor 105 during the variation of magnification. In this embodiment, the focus lens 104 is moved and the image sensor 105 is not moved in a normal autofocus (AF), but the present invention is also applicable to a configuration that moves the image sensor 105 in the AF.

A light flux from an object (not shown) passes through the image-pickup optical system and forms an image on a light-receiving surface of the image sensor 105. In the image sensor 105, a photoelectrically converted electrical charge is accumulated, and the electrical charge is read by a video signal processor 106 with a predetermined timing. The video signal processor 106 has a function as an AD conversion that converts an analog signal from the image sensor 105 into a digital signal. Alternatively, the image sensor may have the AD conversion function, and a video signal as a digital signal may be transmitted and received between the image sensor 105 and the video signal processor 106. The video signal processor 106 performs various processing, such as the amplification, the gamma correction, the white balance correction, the YC conversion, the crack correction, and the JPEG compression, for an output signal from the image sensor 105 to generate a video signal.

The video signal is output to a display unit 108, such as organic ELs and crystal display panels, or a memory 107, such as a memory card, a magnetic disk, and an internal semiconductor memory. Reference numeral 109 denotes an AF circuit (evaluation value generator) that produces an AF evaluation value representing a contrast of a video signal (image signal), such as a luminance signal band-limited by a predetermined band pass filter from a video signal obtained from the video signal processor 106.

Reference numerals 111, 117 and 120 respectively denote motor units for driving the zoom lens 101, the focus lens 104 and the image sensor 105 in the optical axis direction, and reference numeral 114 denotes a motor unit for driving the stop unit 102.

Positions of the zoom lens 101, the focus lens 104, the image sensor 105 and the stop unit 102 are respectively detected by position sensors 110, 116, 119 and 113.

Reference numerals 130, 131 and 132 denote origin detecting sensors, such as a photo interrupter, used to detect an origin of each unit. When the position sensor detects a relative position, an absolute position based on a position of the origin detecting sensor can be calculated by combining the origin detecting sensor and the position sensor. When the position sensor is a potentiometer or the like, position information of the position sensor itself is a absolute position, and therefore no origin detecting sensor is necessary.

Each motor unit is a stepping motor, a DC motor, or a voice coil motor. When the stepping motor is used, a position of each unit can be grasped by counting the number of pulses in the CPU 122, and therefore no position sensor is necessary. Reference numerals 112, 115, 118 and 121 respectively denotes drive mechanisms for supplying driving current to the motor units 111, 114, 117 and 120.

Each motor unit is controlled by the CPU 122 (controller). The CPU 122 moves and positions each unit on the basis of the detection result of each position sensor. The CPU 122 is composed of a microcomputer. The CPU 122 performs a contrast AF that detects an in-focus position by detecting a local maximum of the AF evaluation value (peak) by moving the focus lens 104 in the optical axis direction.

The CPU 122 functions as a first adjuster that adjusts a first tracking curve described later which is set so as to keep the in-focus state between the position of the zoom lens 101 and the position of the image sensor 105. Moreover, the CPU 122 functions as a second adjuster that adjusts a second tracking curve described later which is set so as to keep the in-focus state between the position of the zoom lens 101 and the position of the focus lens 104 for an object distance.

A method for adjusting the tracking curves, which is described later, is implemented as a program executable with a computer. Moreover, as described later, the CPU 122 functions as a controller that controls driving of the focus lens 104 and the image sensor 105 during the variation of magnification on the basis of the adjusted first tracking curve and the adjusted second tracking curve.

Reference numeral 123 denotes a RAM area configured to store each data and a calculated result in the CPU, and reference numeral 124 denotes a ROM area configured to store an operation algorithm executable with the CPU and a fixed value.

Reference numeral 125 denotes an EEPROM configured to store data obtained by adjusting the tracking curve (hereinafter also referred to as "adjustment data") and data used for a detailed correction of the adjusted tracking curve (hereinafter also referred to as "correction data").

Reference numeral 126 denotes a zooming key that is used when a photographer performs zooming, and reference numeral 127 denotes a focusing ring that is used when a photographer performs focusing. Moreover, switching of a power supply of the video camera is performed by a power-on switch 128. Reference numeral 129 denotes a transfer switch for adjusting the tracking curve. The adjustment of the tracking curve is started when the transfer switch 129 is turned on, and the transfer switch 129 held in the off position in the normal photographing. The tracking curve may be adjusted in a manufacturing process of the image-pickup apparatus, or by the photographer before photography.

Figure 2:
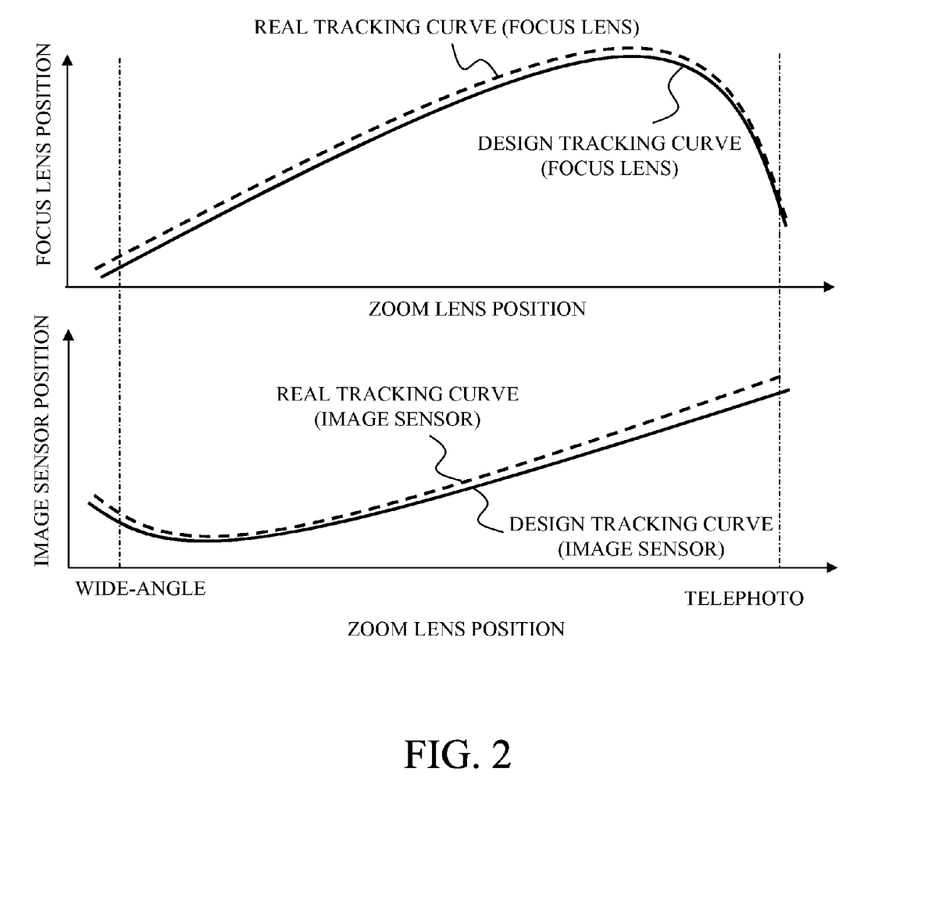
FIG. 2 illustrates graphs of one example of tracking curve for a focus lens and one example of tracking curve for an image sensor.

FIG. 2 illustrates graphs of one example of the tracking curve of the focus lens 104 (upper side) and one example of the tracking curve of the image sensor 105 (lower side). A horizontal axis represents a position on the optical axis of the zoom lens 101 (zoom lens position), and the telephoto end and the wide-angle end are illustrated in the alternate long and short dash line. A vertical axis in the upper side represents a position on the optical axis of the focus lens 104 (focus lens position), and a vertical axis in the lower side represents a position on the optical axis of the image sensor 105 (image sensor position).

The tracking curve in the lower side of FIG. 2 corresponds to the first tracking curve for the image sensor, and the tracking curve in the upper side of FIG. 2 corresponds to the second tracking curve for the focus lens.

Even if a focal length is set to the horizontal axis, a similar tracking curve can be drawn. Moreover, a position in the tracking curve means an absolute position obtained from the position sensor and the origin detecting sensor. The definitions of the "zoom lens position", "focus lens position", and "image sensor position" are similar in other figures.

The solid line in the upper side of FIG. 2 represents a "designed tracking curve (focus lens)". This is a tracking curve based on a designed value (theoretical value) of the focus lens 104 found by a numerical calculation by assuming no manufacturing errors of lens units and the image sensor 105 and no installation errors. In other words, this is the second tracking curve set so as to keep the in-focus state between the position of the (variator lens in the) zoom lens 101 and the position of the focus lens 104. A "real tracking curve (focus lens)" represented with a dotted line in the upper side of FIG. 2 denotes an actual tracking curve of the focus lens 104.

The solid line in the lower side of FIG. 2 represents a "designed tracking curve (image sensor)". This is a tracking curve of the image sensor 105 based on a designed value (theoretical value) found by a numerical calculation by assuming no manufacturing errors of lens units and the image sensor 105, and no installation errors. In other words, this is the first tracking curve set so as to keep the in-focus state between the position of the (variator lens in the) zoom lens 101 and the position of the image sensor 105. A "real tracking curve (image sensor)" represented with a dotted line in the lower side of FIG. 2 denotes an actual tracking curve of the image sensor 105.

The definitions of the "designed tracking curve (focus lens)" and "real tracking curve (image sensor)" are similar in other figures.

In the upper side and the lower side of FIG. 2, the real tracking curve shifts from the designed tracking curve due to the installation errors when the image-pickup apparatus is assembled, the dispersion when the lens is manufactured or the like, and therefore the variation of magnification in the in-focus state is unavailable without the use of the real tracking curve. Therefore, the adjustment of the tracking curve is required.

Figure 3:
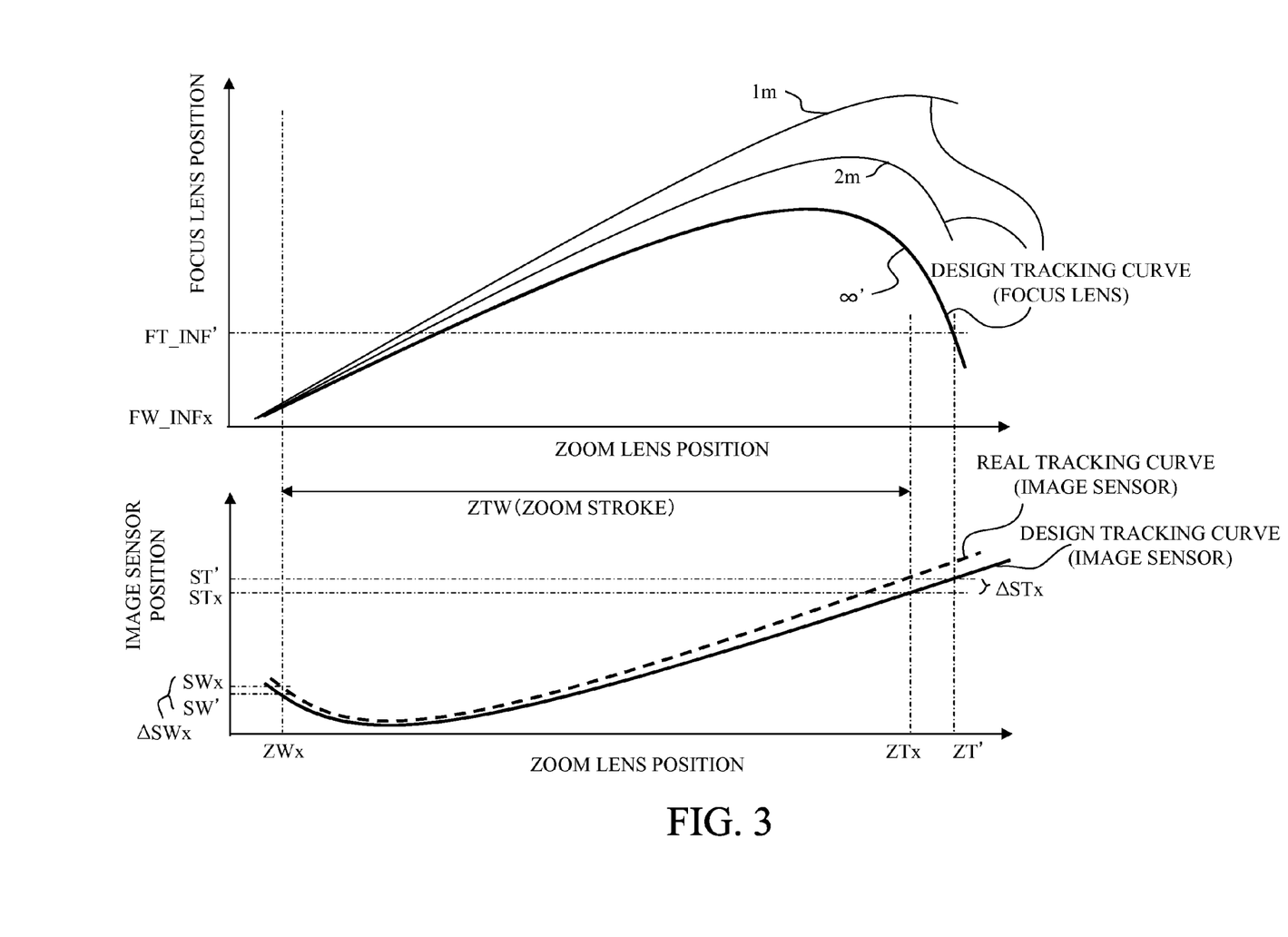
FIG. 3 illustrates graphs of one example of a tracking curve for the focus lens and one example of a tracking curve for the image sensor.

FIG. 3 also illustrates graphs of one example of a tracking curve of the focus lens 104 (upper side) and one example of a tracking curve of the image sensor 105 (lower side). Since the tracking curve of the focus lens changes depending on the object distance, there are a plurality of tracking curves for a variety of object distances, such as 1 m, 2 m, or ∞, and the solid line "∞'" is a tracking curve for the infinite object distance found as a designed value.

An adjustment of a tracking curve will now be discussed for the infinite object distance by using a collimator. In that case, an object chart may be a radially arranged monochrome pattern or the like that facilitates a generation of the AF evaluation value. Moreover, a diaphragm is opened to reduce the influence of the depth of field.

Figure 4:
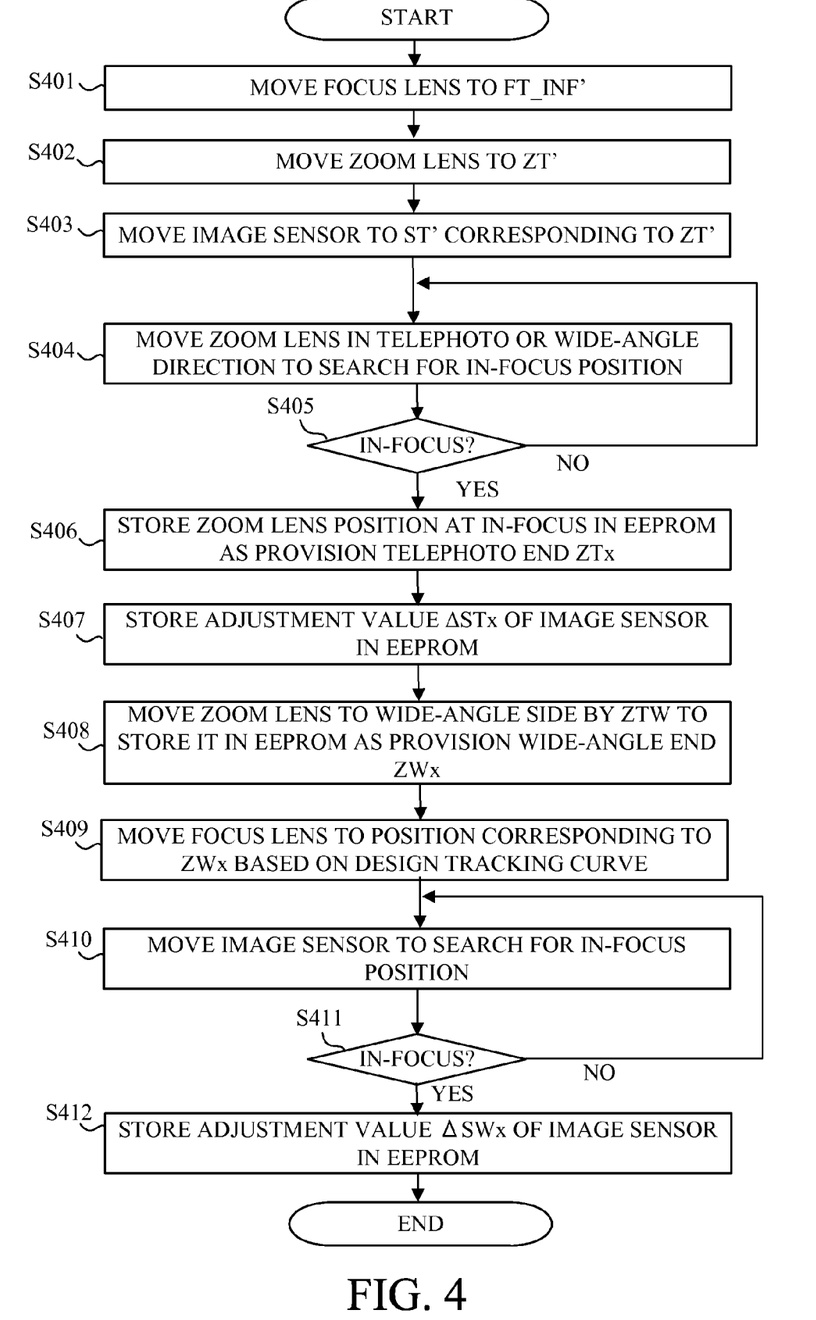
FIG. 4 is a flowchart for explaining a method for adjusting the tracking curve for the image sensor.

FIG. 4 is a flowchart of adjusting steps of the first tracking curve executed with the CPU 122 (first adjusting step), and "S" stands for a step. In the first adjusting step, the designed tracking curve of the image sensor 105 is adjusted to the real tracking curve and as described later, the real tracking curve does not always have to be stored.

First of all, the CPU 122 moves the focus lens 104 to a telephoto end position (first focus lens position) FT_INF' via the motor unit 117 and the drive mechanism 118 according to the designed tracking curve "∞'" (focus lens) illustrated in FIG. 3 (S401).

Then, the CPU 122 moves the zoom lens 101 to a corresponding telephoto end position ZT' via the motor unit 111 and the drive mechanism 112 (S402).

Next, the CPU 122 moves the image sensor 105 to a position (first image sensor position) ST' corresponding to the zoom lens position ZT' via the motor unit 120 and the drive mechanism 121 according to the designed tracking curve (image sensor) illustrated in FIG. 3 (S403). ST' is obtained as a designed value as well as ZT', and is stored in the memory 107 or the ROM 124.

Next, the CPU 122 searches for a zoom lens position (first magnification-varying lens position) which provides a peak of the AF evaluation value, by moving the zoom lens 101 in the telephoto direction or the wide-angle direction (S404, S405).

Next, the CPU 122 stores the zoom lens position determined as the in-focus in S405 in the EEPROM 125 or the RAM 123 as a provision telephoto end ZTx (first magnification-varying lens position) (S406).

Next, the CPU 122 stores adjustment data ΔSTx (=ST'−STx) of the image sensor 105 in the EEPOM 125 (S407). ΔSTx is a difference between a designed telephoto end (first image sensor position) ST' and an image sensor position (second image sensor position) STx corresponding to the provision telephoto end ZTx obtained in S406 (S408).

Next, the CPU 122 moves the zoom lens 101 to a provision wide-angle end (second magnification-varying lens position) ZWx arranged on the wide-angle side by a tele-wide stroke ZTW which is a stroke as a designed value between a telephoto end and a wide-angle end, and stores that position in the EEPROM (S409).

Next, the CPU 122 moves the focus lens 104 to a focus lens position (second focus lens position) FW_INFx corresponding to the zoom lens position ZWx of the designed tracking curve (focus lens) of "∞'" (S410).

Next, the CPU 122 moves the image sensor 105 to search for the in-focus position that provides a peak of the AF evaluation value (S410, S411). Next, the CPU 122 stops moving the image sensor 105 when the in-focus is determined, and acquires a position SWx of the image sensor 105 at that time (third image sensor position). The CPU 122 calculates a difference ΔSWx from a position of an image sensor (fourth image sensor position) SW' corresponding to the provision wide-angle end (second magnification-varying lens position) in the designed tracking curve (image sensor), and stores it in the EEPOM 125 (S412).

ΔSTx and ΔSWx obtained by the tracking adjustment in FIG. 4 are the adjustment data of the tracking curve of the image sensor 105. The CPU 122 calibrates the designed tracking curve (image sensor) based on ΔSTx and ΔSWx into the real tracking curve (image sensor) at a time, or calibrates the image sensor position corresponding to the zoom lens position based on ΔSTx, ΔSWx, and the designed tracking curve (image sensor) whenever it needs. Since the real tracking curve (image sensor) need not be stored in the latter situation, a necessary memory capacity can be reduced.

The zoom lens 101 may be moved at the wide-angle end and the image sensor 105 may be moved at the telephoto end. The first tracking curve may be adjusted at two or more points between the telephoto and wide-angle ends instead of being adjusted at the two points of the telephoto end and the wide-angle end. Moreover, this embodiment secures the magnification of the zoom by using the zoom stroke ZTW for a movement from the telephoto end to the wide-angle end in the adjustment of the first tracking curve. However, when this is not required, data of the telephoto end and the wide-angle end of the designed tracking curve (focus lens) may be used for both the telephoto end and the wide-angle end. This is similar in the second adjusting step described later.

Next, the second tracking curve is adjusted by using the adjusted first tracking curve (second adjusting step). Since the adjustment data of the image sensor are adjustment data for the telephoto end and the wide-angle end, the adjustment data for an arbitrary focal length between the telephoto and wide-angle ends may be obtained by the interpolation processing.

Figure 5:
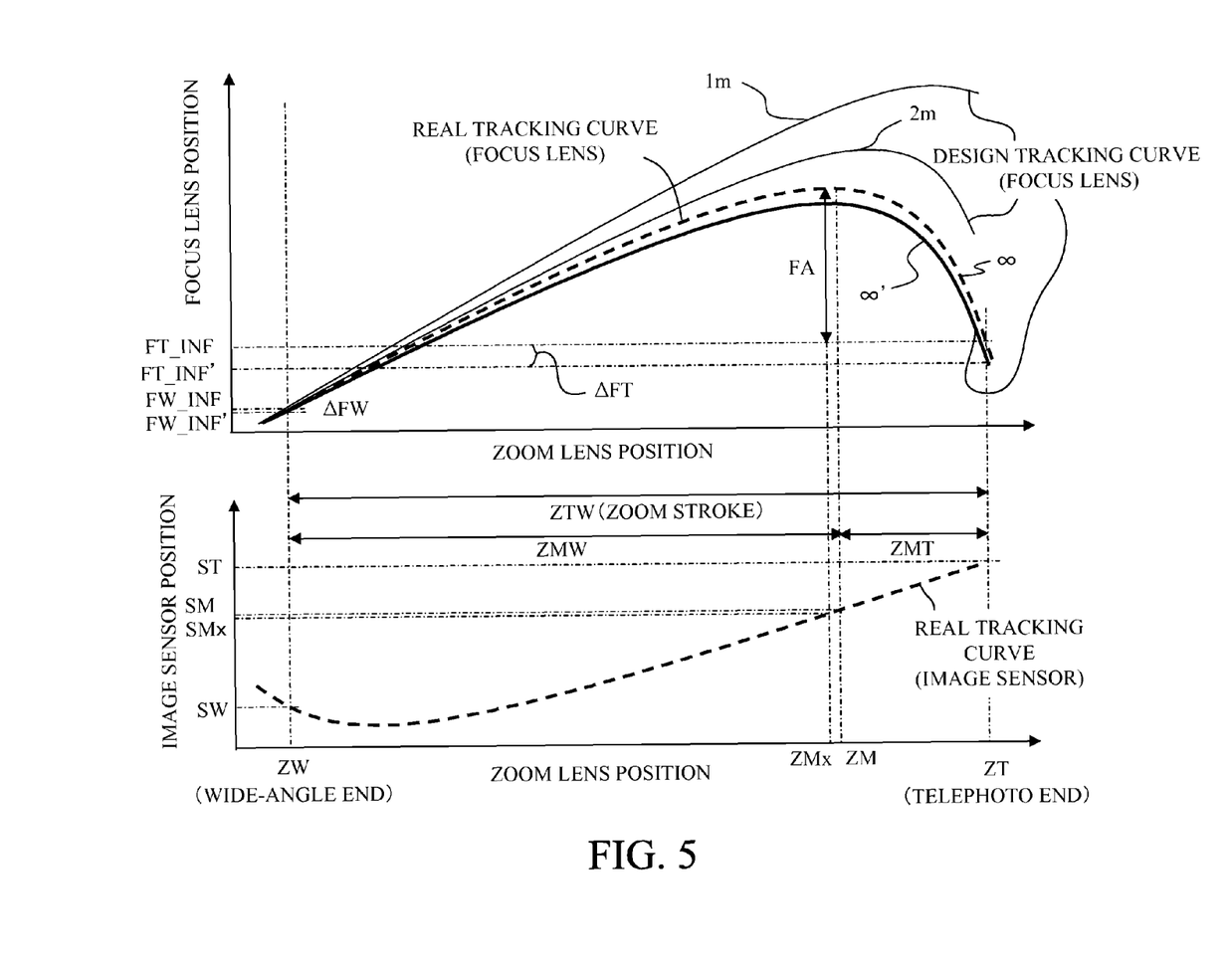
FIG. 5 illustrates graphs of one example of a tracking curve for the focus lens and one example of a tracking curve for the image sensor.

FIG. 5 also illustrates graphs of one example of a tracking curve of the focus lens 104 (upper side) and one example of a tracking curve of the image sensor 105 (lower side). The lower side of FIG. 5 illustrates a real tracking curve (image sensor) adjusted by the first adjusting step illustrated in FIG. 4. The dotted line "∞" in the upper side of FIG. 5 is a real tracking curve (focus lens) corresponding to the solid-line "∞'" tracking curve (focus lens).

Figure 6:
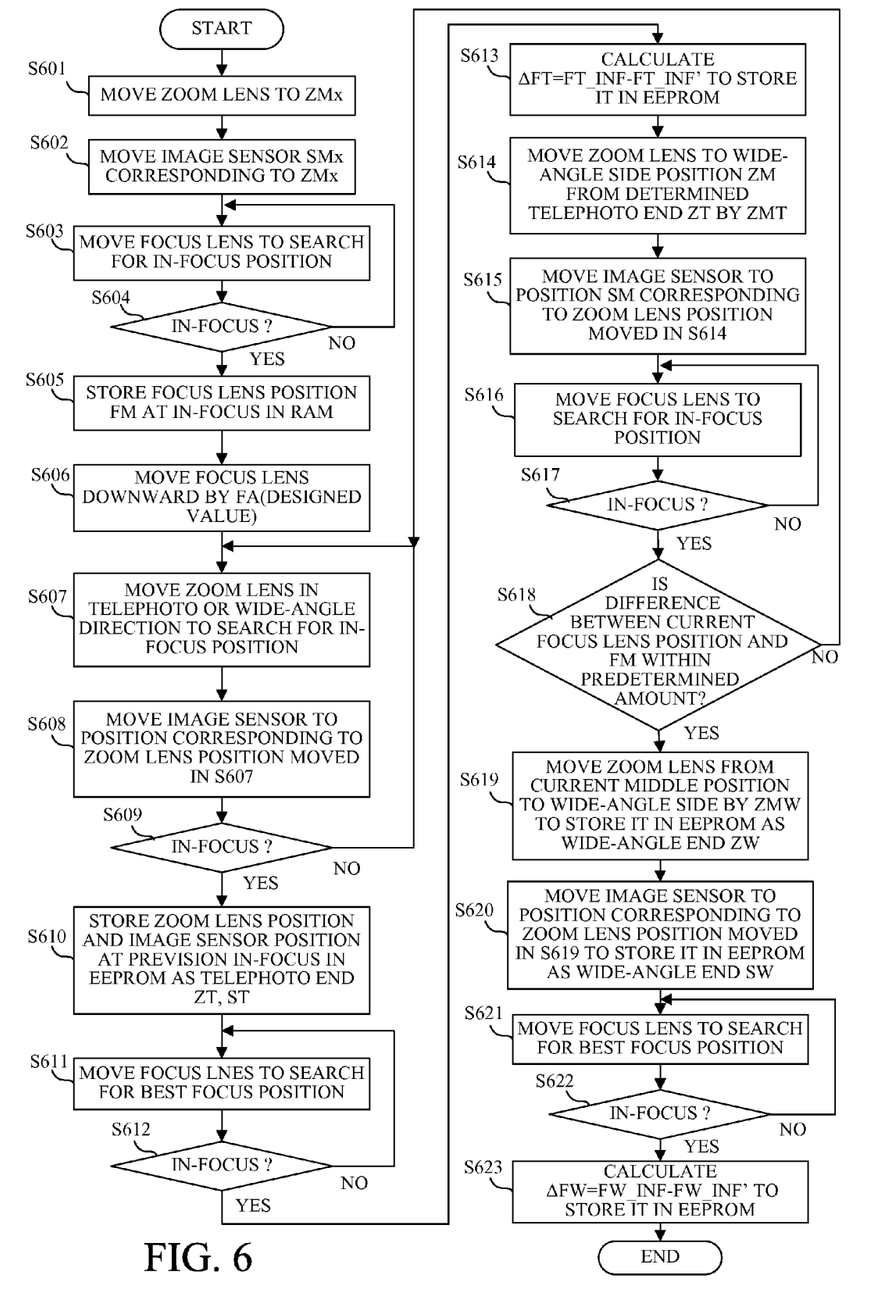
FIG. 6 is a flowchart for explaining a method for adjusting the tracking curve for the focus lens.

FIG. 6 is a flowchart of a tracking adjusting method (second tracking adjusting method) of the focus lens 104 executed with the CPU 122, and "S" stands for a step. An infinite object distance and a diaphragm opening are also assumed in FIG. 6.

First, the CPU 122 moves the zoom lens 101 to a provision middle position ZMx via the motor unit 111 and the drive mechanism 112 (S601). The "middle position" is a zoom lens position corresponding to an inflection point of the designed tracking curve of the focus lens 104 (point with slope 0).

Next, the CPU 122 moves the image sensor 105 to a position SMx corresponding to the zoom lens position ZMx according to the real tracking curve (image sensor) via the motor unit 120 and the drive mechanism 121 (S602).

Next, the CPU 122 moves the focus lens to a close side or an infinity side via the motor unit 117 and the drive mechanism 118, to search for a position that provides a peak of the AF evaluation value or an in-focus position (S603, S604).

Next, the CPU 122 stores a position FM of the focus lens 104 in the in-focus state, in the RAM 123 or the EEPROM 125 (S605).

Next, the CPU 122 moves the focus lens 104 by FA as illustrated in FIG. 5 (S606). The FA is a designed value that corresponds to the distance from a focus lens position corresponding to the middle position of the real tracking curve (focus lens) to a focus lens position corresponding to the telephoto end.

Next, the CPU 122 searches for the position that provides a peak of the AF evaluation value by moving the zoom lens 101 in the telephoto direction or the wide-angle direction (S607, S608). Moreover, the image sensor 105 is moved to a position corresponding to the zoom lens position of S607 by using the real tracking curve (image sensor) in synchronization with the movement of the zoom lens 101. S607 and S608 are repeated until the in-focus state is determined. The "in-focus state", as used herein, means a provision in-focus position because it is found by suing the zoom lens that has a rough resolution. Moreover, the accuracy of the determination improves by performing the acquisition and the determination of the AF evaluation value after the zoom lens and the image sensor each reach target positions.

Next, the CPU 122 stores as a telephoto end a zoom lens position ZT and an image sensor position ST in the provision in-focus state, in the EEPROM 125 (S610). After the provision in-focus state is obtained, a position (third focus lens position) FT_INF that provides a peak of the AF evaluation value is searched by moving the focus lens 104 that has a finer resolution (S611, S612).

The CPU 122 may acquire the zoom lens position ZT and the image sensor position ST of the telephoto end based on the real tracking curve (image sensor) instead of performing S601-S610. Then, the CPU 122 may acquire the focus lens position FT_INF by moving the focus lens 104 at a focus lens position (fourth focus lens position) FT_INF' corresponding to the telephoto end of the designed tracking curve (focus lens).

Next, the CPU 122 acquires a difference between the real focus lens position FT_INF at the telephoto end and the focus lens position FT_INF' as the designed value, and stores it as adjustment data ΔFT in the EEPROM 125 (S613).

The CPU 122 may store FT_INF, but storing ΔFT requires a narrower dynamic range than storing the focus lens position and thus can reduce the necessary capacity of the EEPROM 125. In taking a picture, the zooming in the in-focus state is available by using the stored adjustment data ΔFT to adjust the tracking curve of the focus lens at the telephoto end.

Next, the CPU 122 moves the zoom lens 101 to a zoom lens position ZM arranged on the wide-angle side by tele-middle stroke ZMT that corresponds to a stroke between the telephoto end and the middle position and is obtained as a designed value based on the telephoto end ZT (S614). Moreover, the CPU 122 moves the image sensor 105 to an image sensor position SM corresponding to the zoom lens position ZM according to the real tracking curve (image sensor) (S615).

Next, the CPU 122 searches for the in-focus position that provides a peak of the AF evaluation value, by moving the focus lens 104 around the middle position (S616, S617). Next, the CPU 122 calculates the difference ΔFM between a focus lens position determined as the in-focus and the focus lens position FM acquired in S605, and determines whether this is within a predetermined amount (whether it is equal to or smaller than a threshold value or larger than the threshold value) (S618).

Usually, since a slope of the curve is almost horizontal in the vicinity of the inflection point of a tracking curve of a focus lens, the movement of the focus lens is minute for the movement of the zoom lens. Therefore, if ΔFM is larger than the threshold value, processing is performed again from S607 because some abnormalities can be assumed during the adjustment.

Next, the CPU 122 moves the zoom lens 101 from a current middle position to the wide-angle side by a middle-wide stroke ZMW obtained as a design value, and stores a post-movement position in the EEPROM 125 as a wide-angle end ZW (S619). As a result, a zooming range is available to a photographer between the wide-angle end ZW and the telephoto end ZT, and a magnification obtained as the designed value can be secured.

Moreover, the CPU 122 moves the image sensor 105 to an image sensor position SW corresponding to the zoom lens position ZW, and stores the image sensor position SW in the EEPROM 125 (S620).

In S619 and S620, the CPU 122 may acquire the image sensor position SW corresponding to the zoom lens position ZW at the wide-angle end based on the real tracking curve (image sensor).

Next, the CPU 122 searches for a position (fifth focus lens position) that provides a peak of the AF evaluation value by moving the focus lens 104 around the wide-angle end (S621, S622).

Next, the CPU 122 acquires a focus lens position FW_INF (fifth focus lens position) corresponding to the wide-angle end. Moreover, the CPU 122 acquires a focus lens position FW_INF' (sixth focus lens position) of the wide-angle end based on the designed tracking curve (focus lens). The CPU 122 stores the difference ΔFW between them in the EEPROM 125 (S623). In taking a picture, zooming in the in-focus state is available by using the stored ΔFW to adjust the tracking curve of the focus lens at the wide-angle end.

By the above method, the adjustment data of the telephoto ends ZT and ST and the wide-angle ends ZW and SW, and the adjustment data ΔFT and ΔFW of the focus lens can be obtained, and the tracking control can be performed by driving the focus lens 104 and the image sensor 105 during the variation of magnification.

While the tracking adjustment for the infinite object has been described, a similar adjustment can be performed for a finite object by using the tracking curve for the finite distance.

Moreover, when the tracking curve of the focus lens 104 has a plurality of inflection points, the inflection point closest to the telephoto end may be used. This is because the sensitivity between the focus lens position and the object distance is high and the detection accuracy of the in-focus position is high in the telephoto side.

Moreover, as illustrated in FIG. 5, since the movement between the telephoto end and the middle position (inflection point) is repeated, there is an advantage that the adjusting time can be shortened as the moving time shortens. When the number of inflection point is one or less on the tracking curve of the focus lens 104, a similar tracking adjustment can be performed in the proximity of both the telephoto end and the wide-angle end.

In the adjusting method illustrated in FIG. 6, the adjustment is performed so as to achieve the in-focus at a telephoto position, a middle position, and a wide-angle position, but the designed tracking curves for the image sensor and the focus lens may be different from their real tracking curves at an arbitrary zoom lens position (focal length) between the positions. Accordingly, the correction data may be acquired at an intermediate zoom lens position other than the adjusted zoom lens position, and a detailed correction may be performed during the tracking control.

Figure 7:
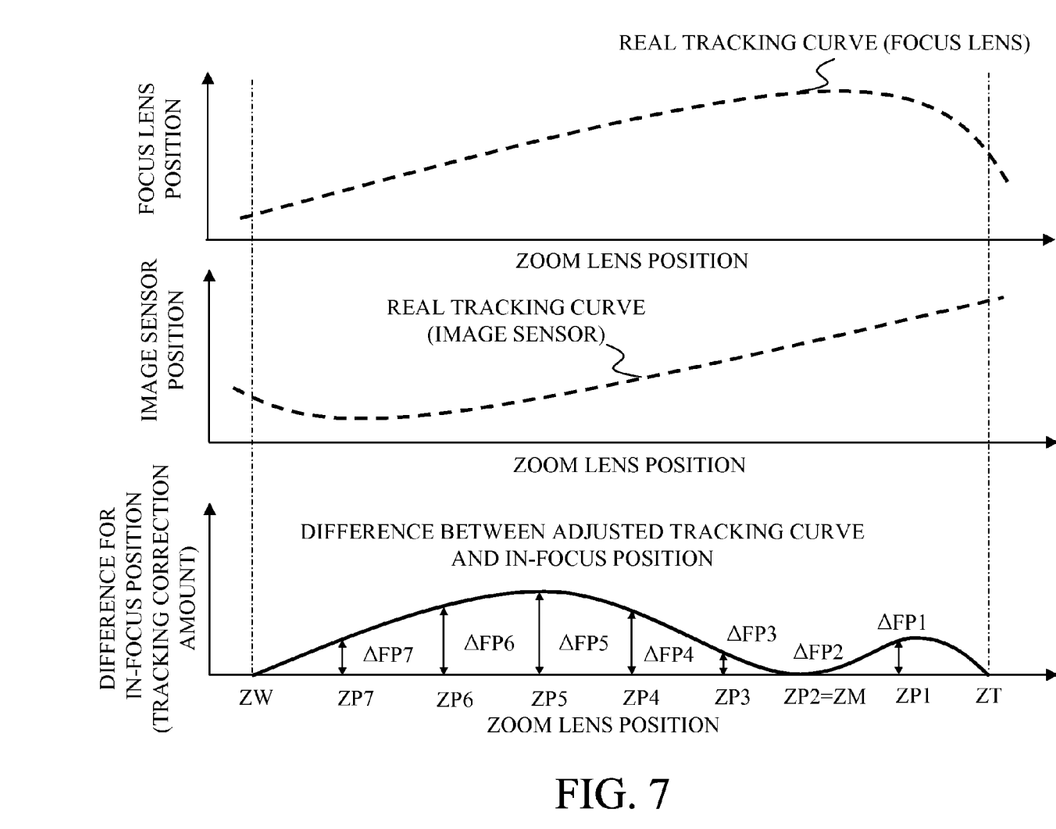
FIG. 7 illustrates graphs of actual tracking curves for the focus lens and the image sensor and a difference between the adjusted tracking curve and an in-focus position of the focus lens.

The top of FIG. 7 is a graph illustrating a real tracking curve of the focus lens 104 (focus lens). The middle of FIG. 7 is a graph illustrating a real tracking curve of the image sensor 105 (image sensor). The bottom of FIG. 7 is a graph illustrating a difference (tracking correction amount) between the post-adjustment tracking curve and the focus lens position in the in-focus state. The horizontal axis of the bottom of FIG. 7 represents a zoom lens position, and the vertical axis represents a tracking correction amount.

Assume a tracking control using adjustment data (including the telephoto end ZT and wide-angle ends ZW, ΔFT, ΔFW, ΔSTx, and ΔSWx) obtained by the tracking adjustment described above. As illustrated in FIG. 7, at the telephoto end ZT, the middle position ZP2(=ZM) and the wide-angle end ZW, a difference is almost 0 between the real in-focus position and the focus lens position of the real tracking curve, but the error may remain at other zoom lens positions. In order to correct these errors, correction data is detected and corrected. Thereby, zooming without blurs can be achieved even at intermediate zoom lens positions.

Figure 8:
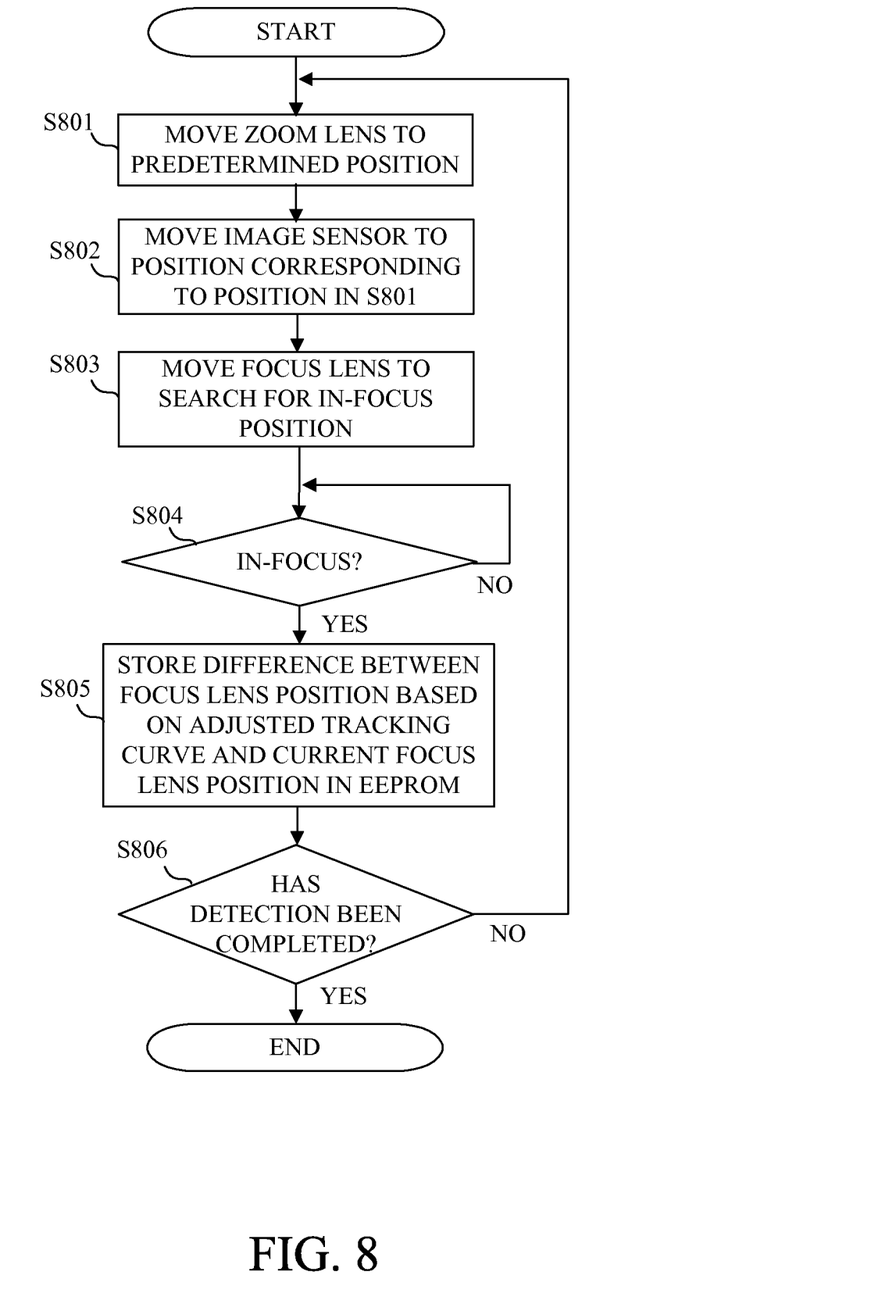
FIG. 8 is a flowchart for explaining a method for detecting correction data in a plurality of zoom lens positions.

FIG. 8 is a flowchart of a method of detecting correction data at a plurality of zoom lens positions, which is executed with the CPU 122, and "S" stands for a step.

First of all, the CPU 122 moves the zoom lens 101 to one of positions ZP1-ZP7 via the motor unit 111 and the drive mechanism 112 (S801). For example, in detecting correction data in order from the telephoto side, the CPU 122 initially moves the zoom lens 101 to the zoom lens position ZP1. The adjustment data has already been found at the telephoto end ZT, at the middle ZM, and at the wide-angle end ZW, but they may be corrected again by this flow.

Moreover, corrections may be performed at narrow intervals of the zoom lens positions; however, excessively narrow intervals can cause a large correction data amount, the large number of detections of correction data, and a long correction-data detecting time period. Accordingly, the zoom lens position intervals used to detect the correction data are set in view of the manufacturing error of the image-pickup apparatus or the requested depth of field.

Next, the CPU 122 moves the image sensor 105 to a position corresponding to the zoom lens position moved in S801 in accordance with the real tracking curve (image sensor) illustrated in the middle of FIG. 7 (S802).

Next, the CPU 122 moves the focus lens 104 to the close side or the infinity side, and detects a position of the focus lens which provides a peak of the AF evaluation value (S803, S804). The evaluating accuracy improves by acquiring and evaluating the AF evaluation value after the focus lens 104, the zoom lens 101 and the image sensor 105 arrive at respective targeted positions, or in the stop state.

Next, the CPU 122 stores in the EEPROM 125 a difference ΔFPn between a current position of the focus lens, determined as the in-focus, and a position of the focus lens based on the post-adjustment tracking curve (S805). For example, the CPU 122 calculates ΔFP1 for the zoom lens position ZP1, and set it to the correction data.

All of the correction data are positive in FIG. 7, but may be negative or positive and negative depending on the individual specificity of the image-pickup apparatus. Moreover, a difference between a current position of the focus lens, determined as the in-focus, and a position of the focus lens based on the designed tracking curve may be stored.

Next, the CPU 122 determines whether the correction data has been detected at all the zoom lens positions to be measured (S806). When the zoom lens position to be measured remains, it returns to S801 and the correction data is detected at the subsequent zoom lens position.

Figure 9:
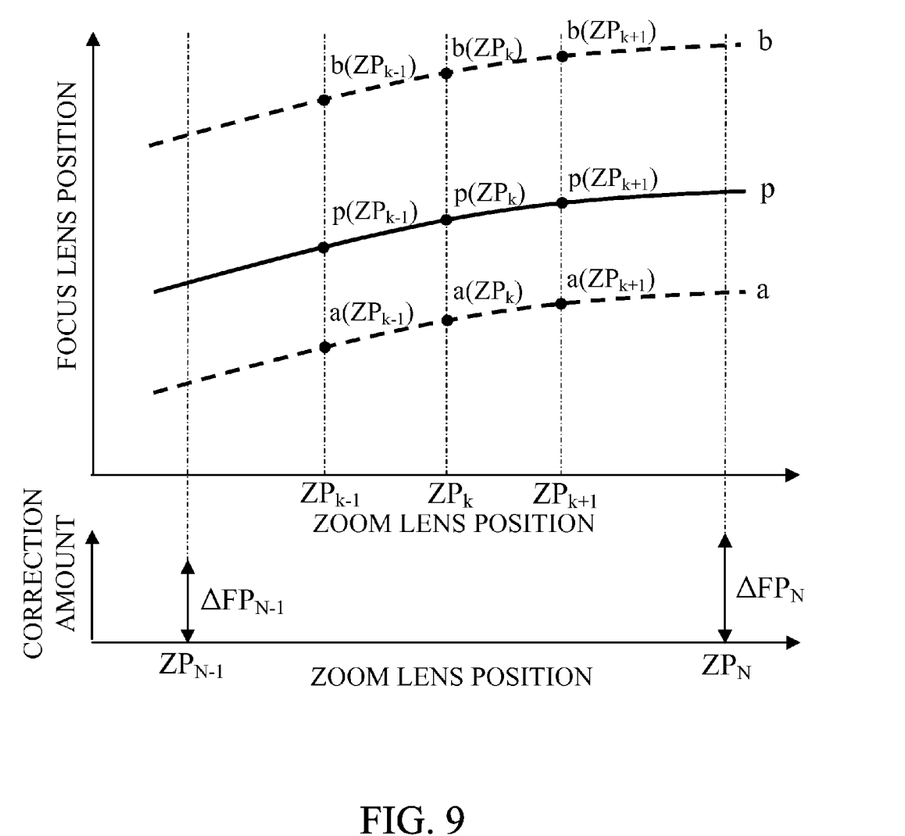
FIG. 9 is a graph for explaining a tracking control.

With reference to FIG. 9, a tracking control at the image pickup time will now be described as an example of the tracking control of the focus lens 104. The tracking control of the image sensor 105 is similar and its description will be omitted. For simple description, the adjustment data and the correction data are assumed to be stored as the difference between the designed value and the real in-focus position.

The solid line p is a tracking curve when the object distance is Lp. Similarly, the dotted lines "a" and "b" are tracking curves when the object distances are La and Lb, and are assumed to be obtained as designed values.

The tracking curves "a" and "b" are stored in the ROM area of the CPU 122 in the form of table data or an expression as lens position (absolute position) information or focal length information. A focus lens position $p(ZP_k)$ where the object distance is Lp and the zoom position is $ZP_k$ is obtained by using the designed value as the following expression.

$$p(ZP_k)=\alpha/\beta \times |b(ZP_k)-a(ZP_k)|+a(ZP_k) \quad \text{EXPRESSION 1}$$

"α" denotes a difference between a designed tracking curve "a" and a tracking curve "p" at an object distance Lp, "β" denotes a difference between the designed tracking curves "a" and "b," and these are represented as the following expressions:

$$\alpha=|p(ZP_k)-a(ZP_k)| \quad \text{EXPRESSION 2}$$

$$\beta=|b(ZP_k)-a(ZP_k)| \quad \text{EXPRESSION 3}$$

Furthermore, a corrected focus lens position $fp(ZP_k)$ can be represented as the following expression by using correction data (or adjustment data) $\Delta FP_{N-1}$ at a zoom lens position $ZP_{N-1}$ and correction data (or adjustment data) $\Delta FP_N$ at a zoom lens position $ZP_N$.

$$fp(ZP_k)=(\Delta FP_{N-1}-\Delta FP_N) \times (p(ZP_k)-ZP_{N-1})/(ZP_{N-1}-ZP_N)+\Delta FP_{N-1}+p(ZP_k) \quad \text{EXPRESSION 4}$$

In other words, a post-correction focus lens position $fp(ZP_k)$ can be obtained at an arbitrary intermediate position by using the adjustment data and the correction data at a focus lens position corresponding to each of two zoom lens positions.

When the calculated focus lens position is stored as table data in rewritable memory, such as an EEPROM, and a continuous tracking control is performed at the image pickup time, a large capacity is required and the cost of CPU or EEPROM increases. Therefore, the above method stores only the designed tracking curve, the adjustment data, and the correction data as lens position and focal length information, and the CPU122 finds a position to be moved, through a calculation.

Moreover, at the telephoto end or the wide-angle end, corrections may be made by a similar calculation using ΔFT and ΔFW. Similarly, a position of the image sensor 105 at an arbitrary zoom lens position can be obtained by using ΔSTx and ΔSWx.

Thus, the first adjusting method fixes the focus lens 104 at each of two points on the designed tracking curve (focus lens), and one of the zoom lens 101 and the image sensor 105 is fixed at a corresponding position. Next, the other of the zoom lens 101 and the image sensor 105 is moved to a position which provides a peak of the AF evaluation value. Then a difference is obtained between a position of the image sensor 105 corresponding to a position of the focus lens 104 and a position of the image sensor which provides a peak on the designed tracking curve (image sensor).

Moreover, the second adjusting method moves the focus lens 104 to a position that provides a peak of the AF evaluation value after fixing the zoom lens 101 and the image sensor 105 at each of two points on the real tracking curve (image sensor). The difference is obtained between a position of the focus lens 104 corresponding to the position of the zoom lens 101 and the position of the focus lens 104 which provides a peak on the second designed tracking curve (focus lens).

This embodiment adjust the first tracking curve by using two points on the second tracking curve as a designed value, and then adjust the second tracking curve by using two points on the adjusted first tracking curve. The two tracking curves can be adjusted comparatively simply and quickly by adjusting the designed tracking curve (focus lens) having a fine resolution afterwords. Moreover, this embodiment previously adjusts the tracking curve of the image sensor, thereby making an image-pickup magnification identical with a designed value and image-pickup angles of field at the telephoto end and at the wide-angle end to the designed value close to the designed values.

The zooming magnification can be secured by using the stroke ZTW when two points on the designed tracking curve (focus lens) are set to the telephoto end and the wide-angle end and the zoom lens is moved between them. The is true of two points on the real tracking curve (image sensor).

Further, the first adjusting method may move the image sensor for one of the two points on the designed tracking curve (focus lens) and move the magnification-varying lens for the other of the two points. As a result, the adjustment data and the correction data are distributed to the zoom lens position, the focus lens position, and the image sensor position, a margin of a driving stroke of each unit considering the manufacturing variation may be small and the image-pickup apparatus can be made small.

Furthermore, the EEPROM 125 may store both the designed tracking curves and the real tracking curves for the focus lens 104 and the image sensor 105. Alternatively, the EEPROM 125 may store only the designed tracking curves for the focus lens 104 and the image sensor 105, and the real tracking curve at an arbitrary position for the zoom lens 101 may be found through a calculation by using an acquired difference. The former can eliminate calculations and provide high-speed processing, whereas the latter can reduce the storage capacity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-254364, filed on Nov. 15, 2010 which is hereby incorporated by reference herein in its entirety.

What is claimed is:

1. A method for adjusting a tracking curve, said method comprising:

a first adjusting step of adjusting a first tracking curve which has been set so as to keep an in-focus state between a position of a magnification-varying lens and a position of an image sensor, the magnification-varying lens being moved in an optical axis direction during a variation of magnification, the image sensor generating an image signal by photoelectrically converting an optical image formed by an image-pickup optical system, and the image-pickup optical system including the magnification-varying lens and a focus lens moved in the optical axis direction during focusing; and a second adjusting step of adjusting a second tracking curve which has been set so as to keep the in-focus state between the position of the magnification-varying lens and a position of the focus lens for an object distance, wherein in the first adjusting step, the focus lens is fixed at each of two points on a set second tracking curve, one of the magnification-varying lens and the image sensor is fixed at a position corresponding to the focus lens, the other of the magnification-varying lens and the image sensor is moved to a position that provides a peak of an evaluation value representing a contrast of the image signal, and a difference between a position of the image sensor corresponding to the position of the focus lens on a set first tracking curve and a position of the image sensor which provides the peak is obtained; and wherein in the second adjusting step, the magnification-varying lens and the image sensor are fixed at each of two points on the first tracking curve adjusted by the first adjusting step, the focus lens is moved to a position that provides a peak of the evaluation value, and a difference between a position of the focus lens corresponding to a position of the magnification-varying lens on the set second tracking curve and the position of the focus lens which provides the peak is obtained.

2. The method according to claim 1, wherein the two points on the set second tracking curve are a telephoto end and a wide-angle end, and
wherein in the first adjusting step, the magnification-varying lens is moved by a stroke between the telephoto end and the wide-angle end when moving the magnification-varying lens from one of the two points on the set second tracking curve to the other.

3. The method according to claim 1, wherein the two points on the adjusted first tracking curve are a telephoto end and a wide-angle end, and
wherein in the second adjusting step, the magnification-varying lens is moved by a stroke between the telephoto end and the wide-angle end when moving the magnification-varying lens from one of the two points on an adjusted first tracking curve to the other.

4. The method according to claim 1, wherein in the first adjusting step, the magnification-varying lens is moved to a position that provides a peak of the evaluation value for one of the two points on the set second tracking curve, and the image sensor is moved to a position that provides the peak of the evaluation value for the other of the two points on the set second tracking curve.

5. The method according to claim 1, wherein the two points on an adjusted first tracking curve are a telephoto end and a wide-angle end, and
wherein in the second adjusting step, a positional difference of the focus lens at the telephoto end is obtained, and the positional difference is again obtained when a difference between a position of the focus lens which provides the peak of the evaluation value in a first condition and a position of the focus lens which provides the peak of the evaluation value in a second condition is larger than a threshold value,
wherein in the first condition, the magnification-varying lens is moved to a position corresponding to a middle position at which the set second tracking curve has a slope of zero, the image sensor is moved to a corresponding position on the adjusted first tracking curve, and the focus lens is moved to the position that provides the peak of the evaluation value, and
wherein in the second condition, the magnification-varying lens is moved from the telephoto end toward the middle position by a stroke between the middle position and the telephoto end, and the image sensor is moved to a corresponding position on the adjusted first tracking curve, and the focus lens is moved to the position that provides the peak of the evaluation value.

6. The method according to claim 1, further comprising the steps of:
detecting a position of the focus lens which provides the peak of the evaluation value after the magnification-varying lens and the image sensor are moved according to an adjusted first tracking curve; and
obtaining a difference between the position of the focus lens detected by the detecting step and a position of the focus lens corresponding to a position of the magnification-varying lens obtained from an adjusted second tracking curve.

7. The method according to claim 1,
wherein in the first adjusting step,
when the focus lens is located in a first focus lens position of the set second tracking curve, the magnification-varying lens is moved to a first magnification-varying lens position which provides a peak of the evaluation value while the image sensor is fixed at a corresponding first image sensor position on the set first tracking curve, and a difference between the first image sensor position and a second image sensor position corresponding to the first magnification-varying lens position on the set first tracking curve is obtained,
when the magnification-varying lens is moved to a second magnification-varying lens position and the focus lens is moved to a corresponding second focus lens position on the set second tracking curve, the image sensor is moved to a third image sensor position which provides a peak of the evaluation value, and a difference between the third image sensor position and a fourth image sensor position corresponding to the second magnification-varying lens position on the set first tracking curve is obtained,
wherein in the second adjusting step,
when the magnification-varying lens is located at a telephoto end and the image sensor is located at a corresponding position on the adjusted first tracking curve, the focus lens is moved to a third focus lens position which provides a peak of the evaluation value, and a difference between the third focus lens position and a fourth focus lens position corresponding to the telephoto end on the set second tracking curve is obtained, and
when the magnification-varying lens is located at a wide-angle end and the image sensor is located in a corresponding position on the adjusted first tracking curve, the focus lens is moved to a fifth focus lens position which provides a peak of the evaluation value, and a difference between the fifth focus lens position and a sixth focus lens position corresponding to the wide-angle end on the set second tracking curve is obtained.

8. An image-pickup apparatus comprising:
a magnification-varying lens that is moved in an optical axis direction during a variation of magnification;
a focus lens that is moved in the optical axis direction when correcting a focus shift caused due to the variation of magnification or when focusing;
an image sensor that photoelectrical converts an optical image formed by an image-pickup optical system including the magnification-varying lens and the focus lens to generates an image signal, and is moved in the optical axis direction when correcting a focus shift caused due to the variation of magnification;
an evaluation value generator that generates an evaluation value representing a contrast of the image signal formed by the image sensor;
a first adjuster that adjusts a first tracking curve which has been set so as to keep an in-focus state between a position of the magnification-varying lens and a position of the image sensor;
a second adjuster that adjusts a second tracking curve which has been set so as to keep the in-focus state between the position of the magnification-varying lens and a position of the image sensor for an object distance; and
a controller that controls a drive of the focus lens and the image sensor during variation of magnification based on a first tracking curve adjusted by the first adjuster and a second tracking curve adjusted by the second adjuster, wherein the first adjuster fixes the focus lens at each of two points on a set second tracking curve, and fixes one of the magnification-varying lens and the image sensor at a position corresponding to the focus lens, moves the other of the magnification-varying lens and the image sensor to a position that provides a peak of an evaluation value representing a contrast of the image signal, and obtains a difference between a position of the image sensor corresponding to the position of the focus lens on a set first tracking curve and a position of the image sensor which provides the peak, and wherein the second adjuster fixes the magnification-varying lens and the image sensor at each of two points on the first tracking curve adjusted by the first adjuster, moves the focus lens to a position which provides a peak of the evaluation value, and obtains a difference between a position of the focus lens corresponding to a position of the magnification-varying lens on a set second tracking curve and a position of the focus lens which provides the peak.

9. The image-pickup apparatus according to claim 8, wherein the first adjuster generates an adjusted first tracking curve by an interpolation based on the difference between the positions of the image sensor, the second adjuster generates an adjusted second tracking curve by an interpolation based on the difference between the positions of the focus lens, the image-pickup apparatus further comprises a memory that stores the set first tracking curve, the set second tracking curve, the adjusted first tracking curve, and the adjusted second tracking curve, and the controller performs the tracking control by using the adjusted first tracking curve and the adjusted second tracking curve which are stored in the memory.

10. The image-pickup apparatus according to claim 8, further comprising a memory that stores the set first tracking curve, the set second tracking curve, the difference between the positions of the image sensor which is obtained by the first adjuster, and the difference between the positions of the focus lens which is obtained by the second adjuster, wherein the controller performs the tracking control by calculating a position of the focus lens on the adjusted first tracking curve and a position of the image sensor on the adjusted second tracking curve for an arbitrary position of the magnification-varying lens by using the set first tracking curve, the set second tracking curve, the difference between the positions of the image sensor and the difference between the positions of the focus lens which are stored in the memory.

* * * * *